(No Model.) 9 Sheets—Sheet 1.
C. GROTZ.
SCREW MACHINE.

No. 507,494. Patented Oct. 24, 1893.

Witnesses:
Chas. Gaylord
E. J. Zimmerman

Inventor:
Charles Grotz,
By Banning & Banning & Payson
Attys.

(No Model.) 9 Sheets—Sheet 2.

C. GROTZ.
SCREW MACHINE.

No. 507,494. Patented Oct. 24, 1893.

Witnesses:
Chas. E. Gaylord,
C. J. Zimmerman.

Inventor:
Charles Grotz,
By Banning & Banning & Payson,
Att'ys.

(No Model.) 9 Sheets—Sheet 4.

C. GROTZ.
SCREW MACHINE.

No. 507,494. Patented Oct. 24, 1893.

Witnesses:
Inventor:
Charles Grotz
By Banning & Banning & Payson,
Att'ys (No Model.) 9 Sheets—Sheet 5.

C. GROTZ.
SCREW MACHINE.

No. 507,494. Patented Oct. 24, 1893.

Witnesses:
Chas. E. Gaylord.
C. J. Zimmerman.

Inventor:
Charles Grotz
By Banning & Banning & Payson,
Att'ys

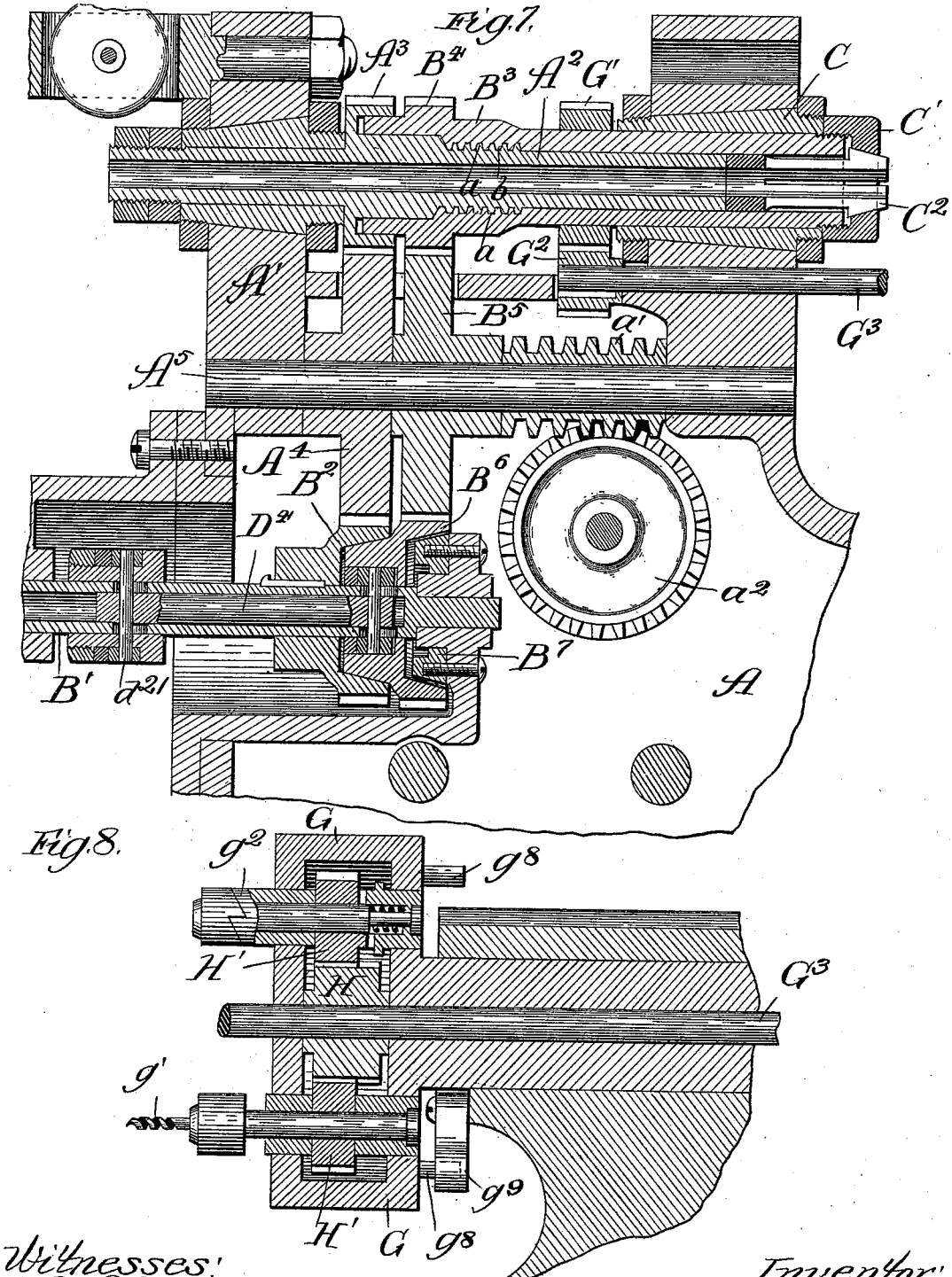

(No Model.) 9 Sheets—Sheet 7.
C. GROTZ.
SCREW MACHINE.
No. 507,494. Patented Oct. 24, 1893.
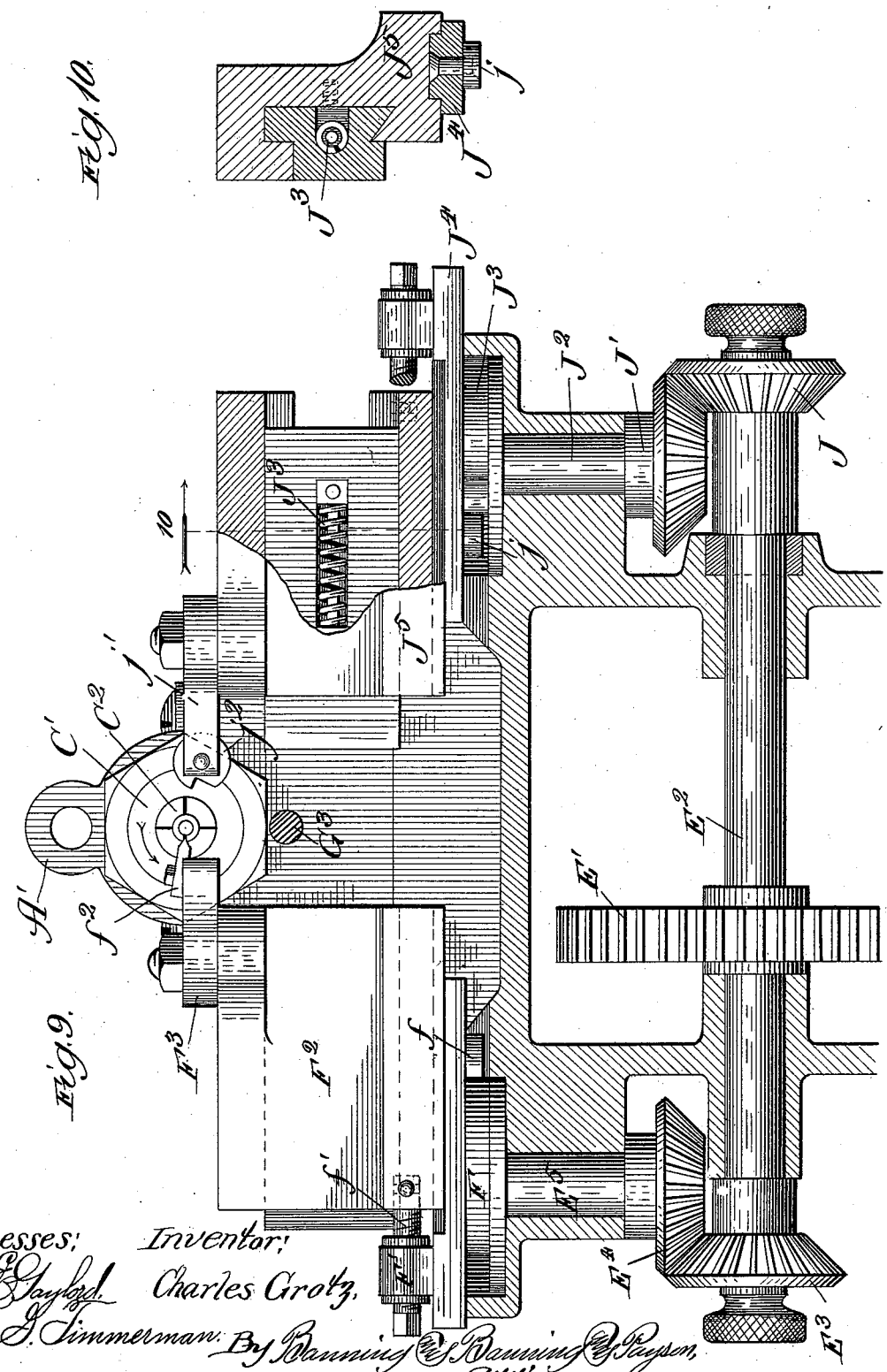
Witnesses: Inventor:
Chas. E. Gaylord. Charles Grotz,
E. S. Zimmerman. By Banning & Banning & Payson,
Att'ys.

(No Model.) 9 Sheets—Sheet 8.

C. GROTZ.
SCREW MACHINE.

No. 507,494. Patented Oct. 24, 1893.

Witnesses:
Chas. E. Gaylord,
C. J. Zimmerman.

Inventor:
Charles Grotz,
By Banning & Banning & Payson,
Att'ys.

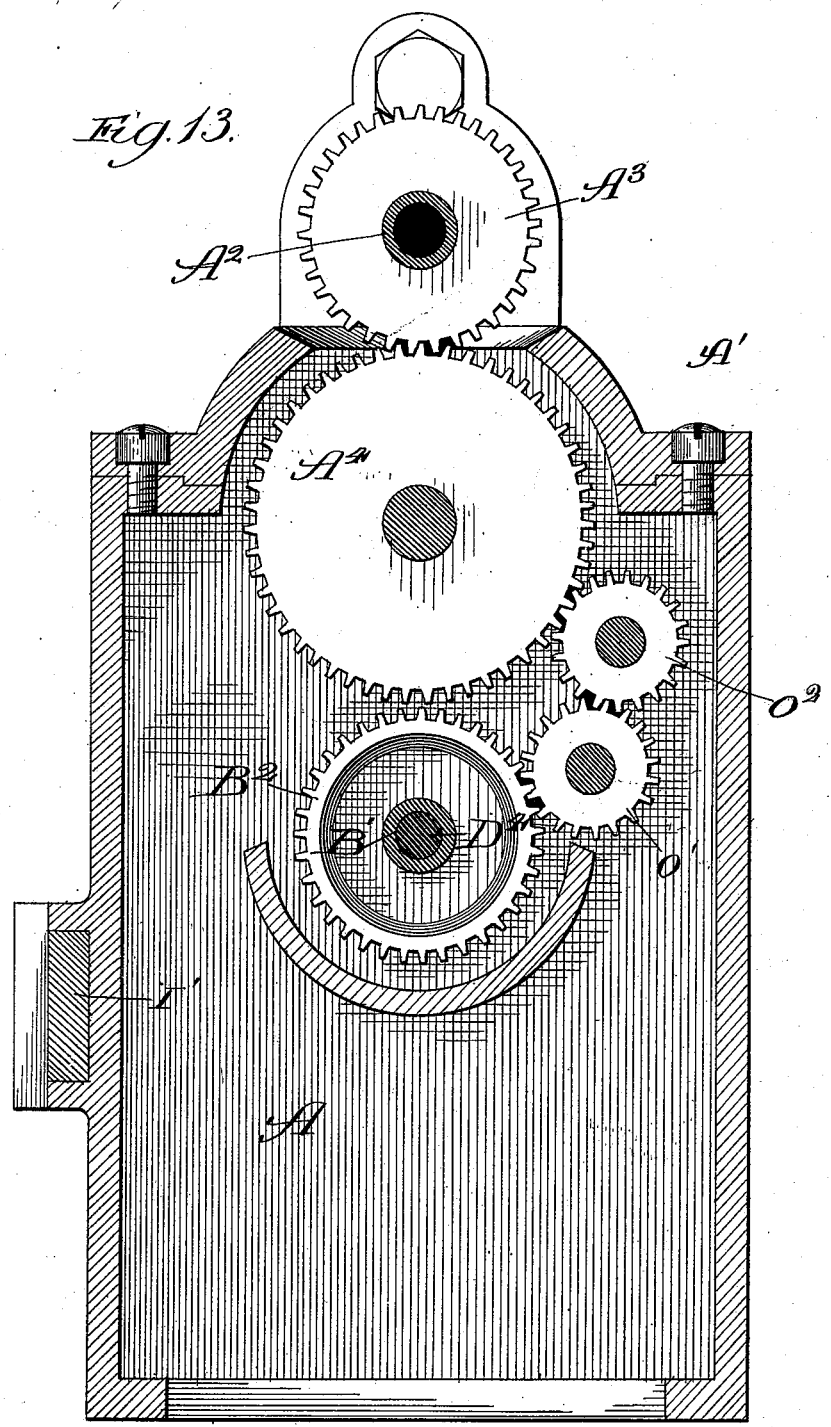

UNITED STATES PATENT OFFICE.

CHARLES GROTZ, OF OTTUMWA, IOWA, ASSIGNOR OF THREE-FOURTHS TO THE HARDSOCG MANUFACTURING COMPANY, OF SAME PLACE.

SCREW-MACHINE.

SPECIFICATION forming part of Letters Patent No. 507,494, dated October 24, 1893.

Application filed September 13, 1892. Serial No. 445,832. (No model.)

*To all whom it may concern:*

Be it known that I, CHARLES GROTZ, a citizen of the United States, residing at Ottumwa, Iowa, have invented certain new and useful Improvements in Screw-Making Machines, of which the following is a specification.

The object of my invention is to make a machine for manufacturing screws out of wire or rod; and my invention consists in the features, combinations and details of construction hereinafter described and claimed.

Figure 1:
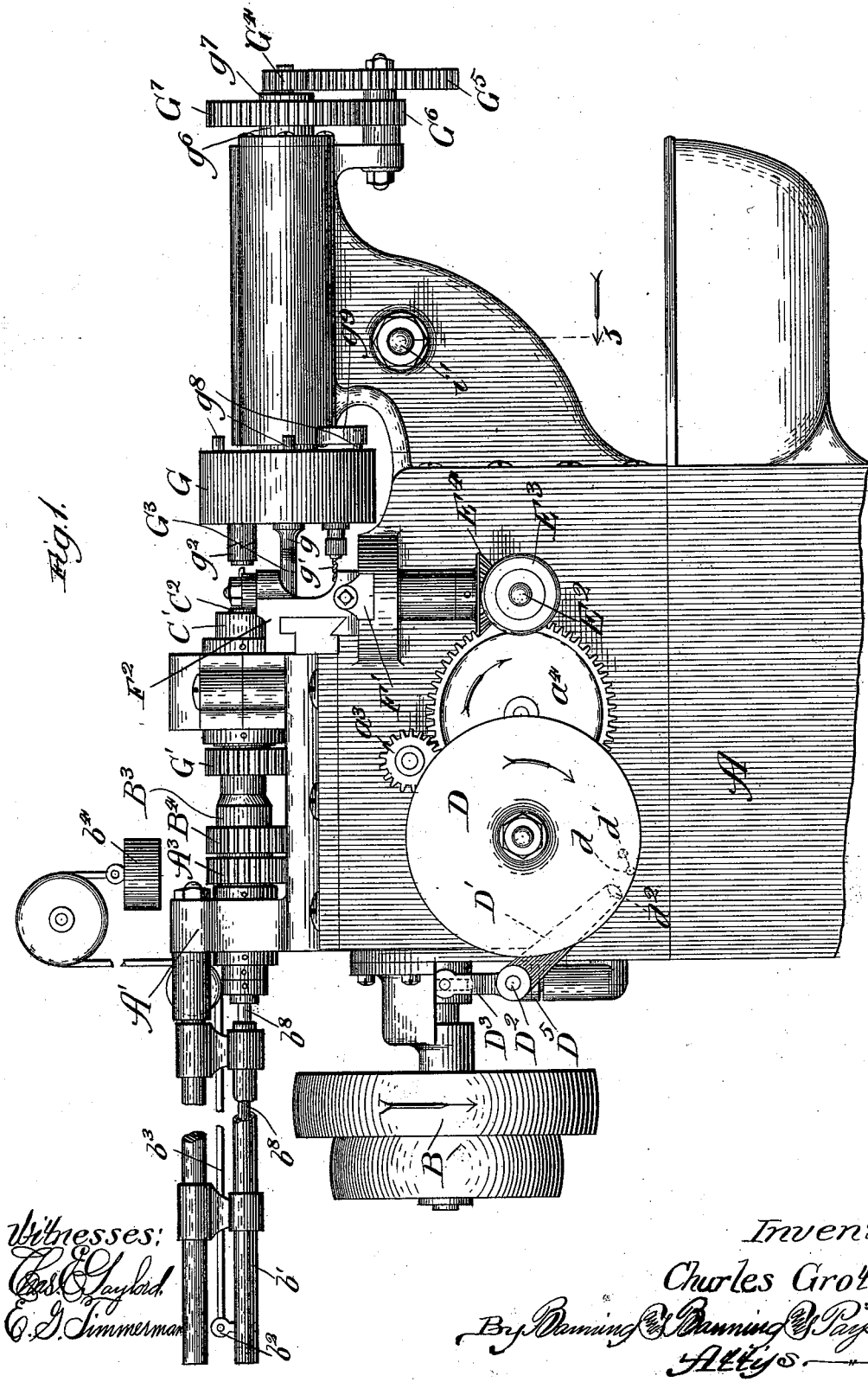
Figure 2:
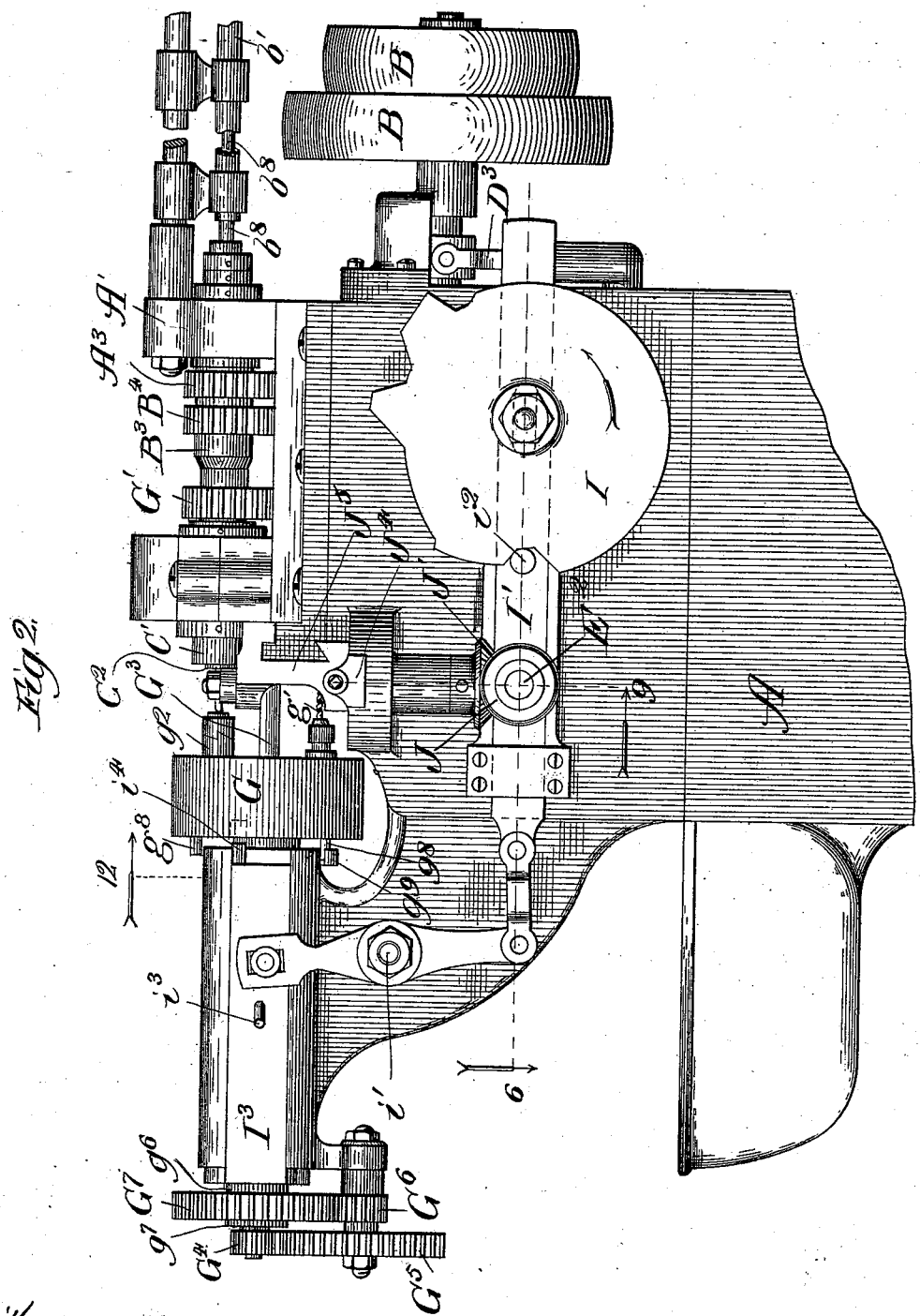
Figure 3:
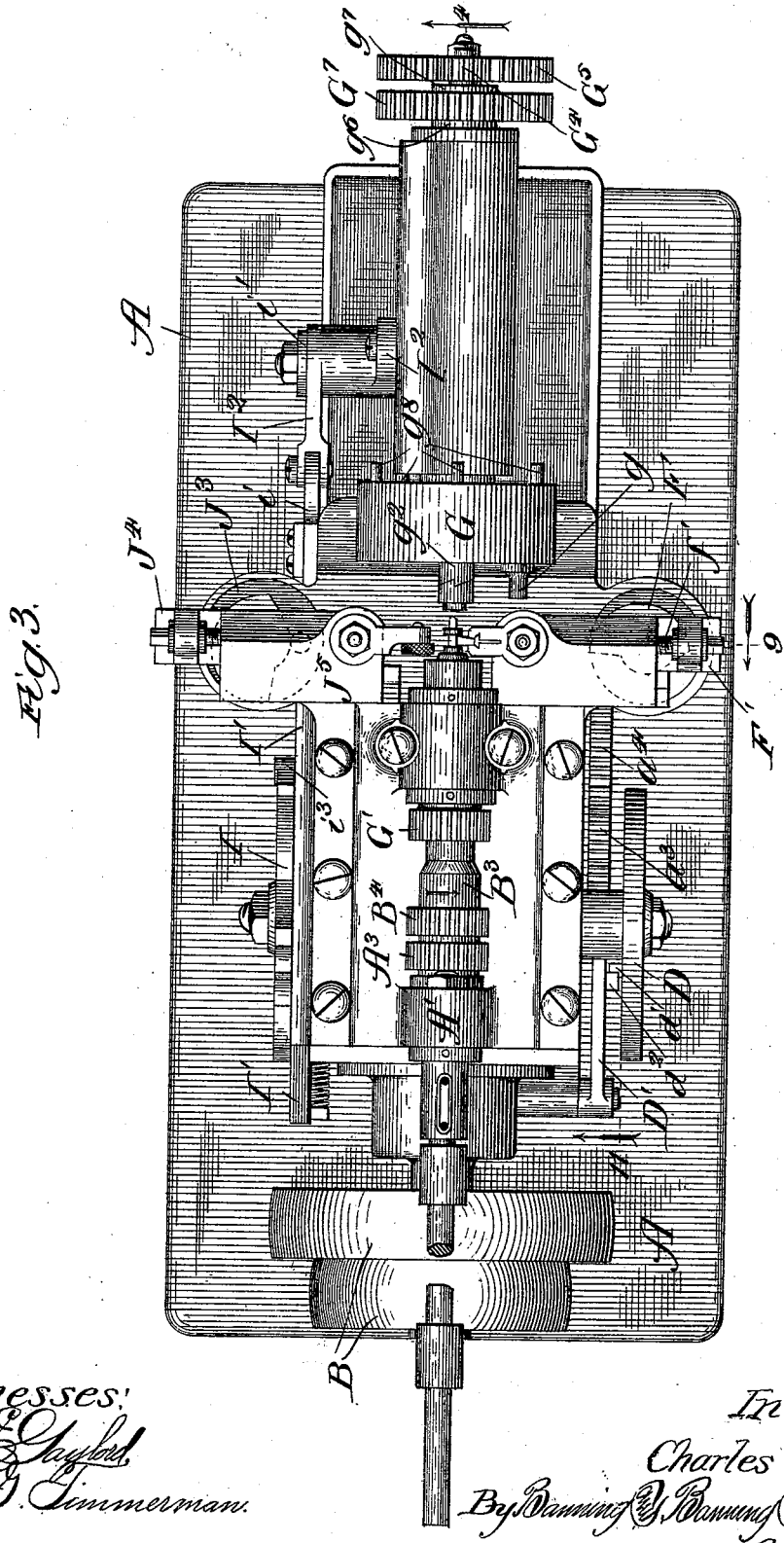
Figure 4:
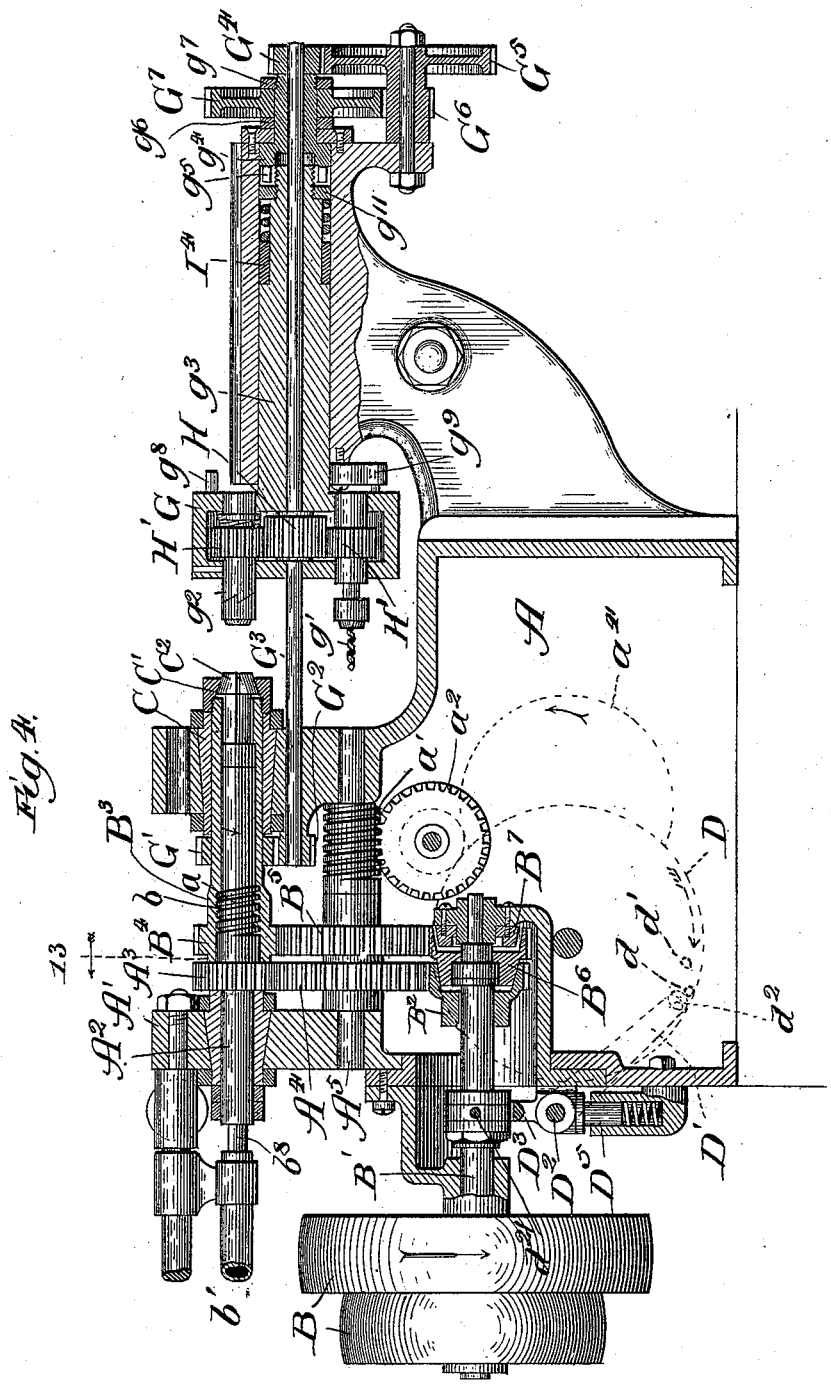
Figure 5:
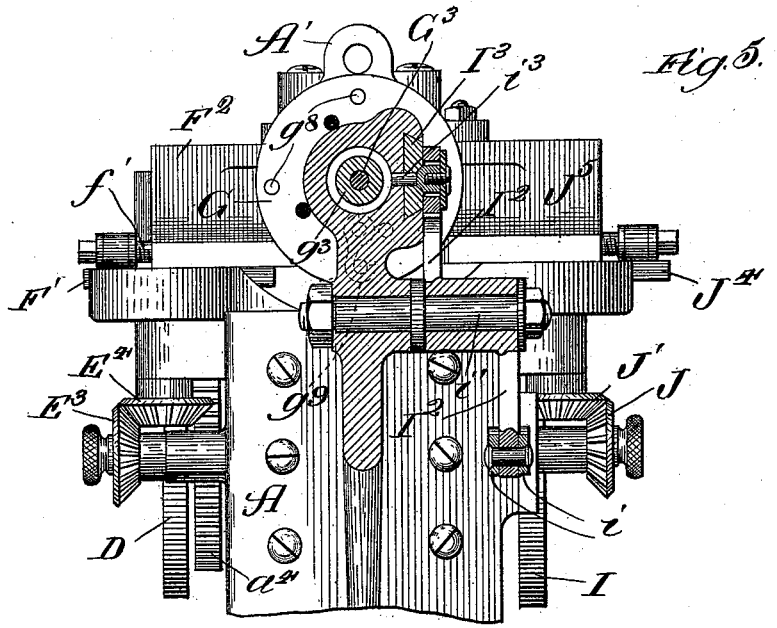
Figure 6:
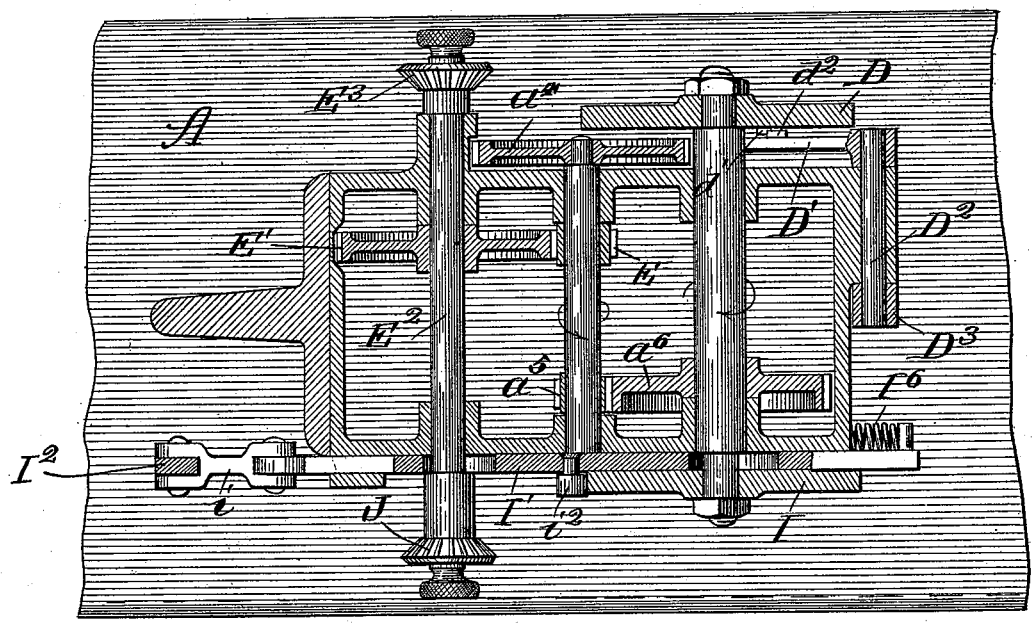
Figure 11:
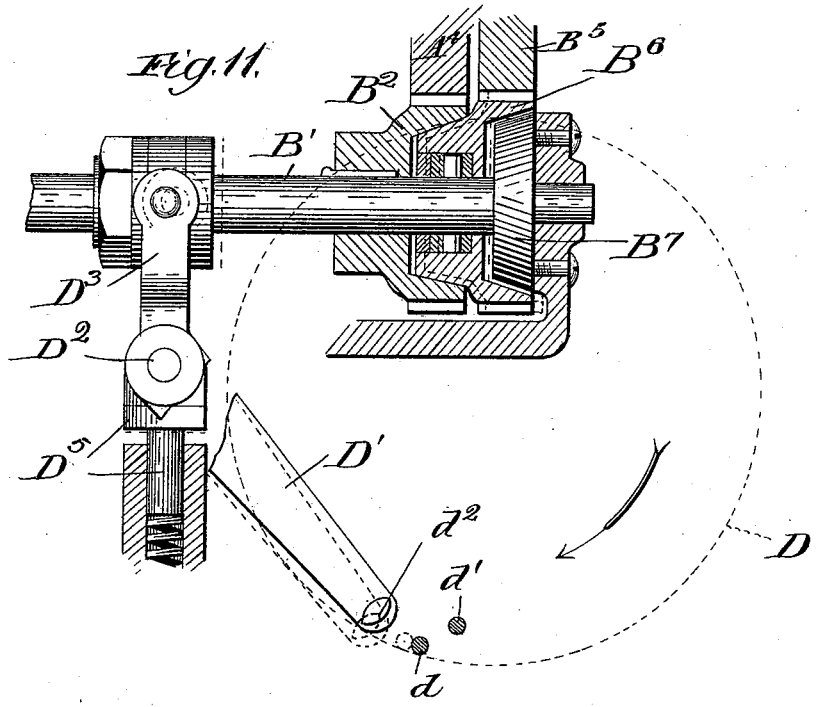
Figure 12:
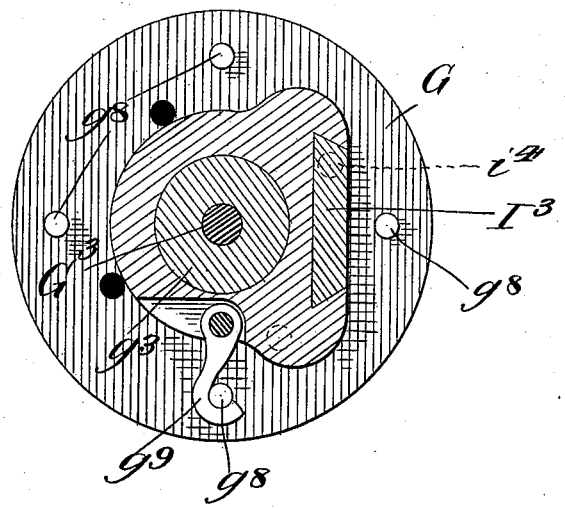

In the drawings, Figure 1 is a side elevation of my improved screw-making machine. Fig. 2 is a side elevation taken at the opposite side of the machine. Fig. 3 is a plan view of my improved machine. Fig. 4 is a longitudinal vertical section taken on the line 4 of Fig. 3. Fig. 5 is a transverse vertical section taken on the line 5 of Fig. 1. Fig. 6 is a plan view of a horizontal section taken on the line 6 of Fig. 2. Fig. 7 is a longitudinal vertical section of a portion of the machine shown in Fig. 4, but enlarged. Fig. 8 is a vertical longitudinal section of another portion of the machine shown in Fig. 4, but enlarged. Fig. 9 is a front elevation of a transverse section taken on the line 9 of Fig. 2. Fig. 10 is a transverse section of a portion of the machine shown in Fig. 9, taken on the line 10 of such figure. Fig. 11 is a side elevation, partly in section, of a portion of the machine taken on the line 11 of Fig. 3. Fig. 12 is a front elevation of a vertical section, taken on the line 12 of Fig. 2; and Fig. 13 a sectional view on line 13 of Fig. 4.

In making my improved screw manufacturing machine, I make it of what may be termed four main divisions of mechanism. The first of these divisions comprises the mechanism for feeding the wire or rod to be made into screws forward, holding it in position to be operated upon, and releasing it after such operation. The second division comprises the mechanism for cutting or forming the external shape of the finished screw. The third division comprises the mechanism for forming the thread upon the screw, where it is externally threaded, or boring it and forming the internal thread, where it is an internally threaded screw. The fourth division comprises the means for cutting off the screw after the rod or wire has been advanced and the external form of the screw given to it, and after it has received its thread. I will describe the various mechanism, details and operations of these four main divisions in the order in which I have enumerated them above.

First. In making my screw threading machine, I make a frame or bed A, in which the various parts are intended to be mounted and supported. I arrange in the upper part of the frame-work, or at other convenient place in the same, a head $A'$, for carrying the feeding and driving mechanism. I arrange in this head a hollow driving spindle $A^2$, mounted in suitable bushings in which it is rotated. To impart motion to this hollow driving shaft, I mount on it, and fixed to rotate with it, a spur pinion $A^5$. The teeth of this spur pinion mesh or engage with the teeth of another intermediate driving gear $A^4$, mounted on and secured to a shaft $A^5$. To apply the initial power to the machine, I arrange pulleys B, of different sizes, so that greater or less speed of rotation may be imparted to the machinery as desired. These pulleys, and the shaft $B'$ on which they are mounted, are driven by belt connections with any convenient motive power. Mounted upon this shaft and secured thereto, so as to rotate with it, is a pinion $B^2$, which, through the train of gears $O'$, $O^2$, $A^4$ and $A^3$, imparts the motion of the shaft $B'$ to the main driving spindle $B^2$. (See Fig. 13.) Surrounding the main driving spindle is arranged a hollow draw-in spindle $B^3$, which carries a spur pinion $B^4$, with its teeth engaging the teeth of an intermediate gear $B^5$, loosely mounted on the shaft $A^5$, with its teeth engaging with the teeth of the pinion $B^6$, loosely mounted on the shaft $B'$. The pinion $B^2$ is provided with an internal bevel, and the pinion $B^6$ with an adjacent external bevel, as shown in Figs. 4 and 7, so that the two pinions may be brought into frictional contact with each other to impart rotation from the pinion $B^2$ to the pinion $B^6$. The pinion $B^6$ is also provided with an internal bevel, as shown in the drawings, and adjacent to it is arranged an externally beveled friction disk $B^7$ fastened to the framework, so that as the pinion $B^6$ is moved toward it, its external bevel will engage with the internal bevel of the pinion, so as to stop its further rotation. I arrange around the end of the draw-in spindle a bushing C, which is held fixed in the framework, and in which the draw-in spindle rotates. A cap C' is arranged on the end of the draw-in spindle by screw threads, as shown in Figs. 4 and 7, and it is provided with an internal bevel opening, flaring inwardly and adapted to engage the external beveled or tapering end of a spring chuck $C^2$, arranged in the end of the draw-in spindle, so that as the cap C' is moved backward or forward by the movements of the draw-in spindle, its internal bevel will engage with or disengage from the taper end of the chuck, so that the two may rotate together or separately, as the particular stage of the operations may require. In this way, the jaws of the chucks are opened or closed to release or grip the rod or wire which is being formed into screws. The driving spindle $A^2$ is provided with external threads $a$, engaging internal threads $b$ of the draw-in spindle, to impart a longitudinal movement to the same as desired. When the driving spindle is rotating, the draw-in spindle will be moving longitudinally through the engagement of these threads, until the friction between the cap C', and the taper chuck $C^2$, has become such as to sufficiently grip the wire in the jaws of the chuck, when the two spindles will rotate together. To cause this longitudinal movement of the draw-in spindle on the driving spindle at the proper time, I arrange a timing plate D, at the desired position in the frame, so that it will make one revolution during the time required for the formation of one screw. This timing plate is provided with two pins $d$, $d'$, extending out a little distance from its face, at the proper position to trip the lever D', as the pin $d$ impinges against a stud $d^2$, arranged on such lever to project in toward the timing plate. The other end of the lever D' is mounted on a shaft $D^2$, and is rigidly connected with a forked clutch $D^3$. This clutch $D^3$ has a pin $d^{21}$, engaging with a shaft $D^4$, arranged within the shaft B, as shown in Fig. 7. As the pin $d$ on the timing plate impinges the pin or stud $d^2$ on the end of the lever D', the said lever is forced up, which causes it to withdraw on its pivot and retract the clutch $D^3$. As this clutch recedes, it carries with it the pinion $B^6$, so that its external bevel engages the internal bevel of the driving pinion $B^2$, and is rotated with it. The train of gears $B^6$, $B^5$ and $B^4$, more especially $B^6$ and $B^4$, are of such diameter when compared with the train of gears $B^2$ to $A^3$, that the velocity of the pinion $B^4$ is greater than the velocity of $A^3$; consequently when the pinion $B^6$ is in frictional engagement with the pinion $B^2$, so as to rotate with it, the draw-in spindle $B^3$ is caused to rotate relatively faster than the main driving spindle $A^2$, and is carried forward longitudinally on the thread $b$, carrying with it its cap C' in that direction which releases the spring chuck. As the pin $d$, through the continued rotation of the timing plate, passes the stud $d^2$ on the lever D', the lever resumes its normal position, and the pin $d'$ impinges with the stud $d^2$, causing the free end of the lever to move downward and permitting the stud $d^2$ to pass between the two pins, which movement advances the clutch $D^3$ and with it the pinion $B^6$, which in turn engages in frictional contact with the disk $B^7$, so as to stop the further rotation of the pinion $B^6$, and, through its train of gears, the draw-in spindle $B^3$. The main spindle continuing its rotation, its threaded portion engaging the draw-in spindle $B^3$ with its cap C', is drawn back in that direction which tightens or closes the spring chuck on the material or wire rod to be operated upon. This opening and closing of the chuck takes place while the pins $d$, $d'$ are in contact with the studs $d^2$. As soon as they have passed by, the lever is moved by the spring and platen $D^5$ into its normal or neutral position, so that the pinion $B^6$ is thrown out of frictional contact with the pinion $B^2$, but not far enough to be in frictional contact with the plate $B^7$, thus permitting the draw-in spindle to rotate with the same velocity and in conjunction with the main driving spindle. It will thus be seen from the foregoing description of the construction and operation that an intermittent rotary motion is imparted to the train of gears which operate the draw-in spindle, so that it is rotated at the desired times at a greater velocity than the main driving spindle, and prevented from rotation at desired times, and during the period between this intermittent greater velocity and its period of rest, it is permitted to rotate with the main driving spindle, so that the opening and closing of the chuck is done altogether by means automatic. It will be understood that the timing plate D makes one rotation while the screw or other article to be formed is being manufactured, thus opening and closing the chuck once in every rotation. To secure the rotation of the timing plate at the proper velocity, and in the desired period of time, I arrange a worm $a'$ on the shaft $A^5$, engaging with the worm gear $a^2$, which rotates the shaft on which it is mounted. This shaft carries a pinion $a^3$, engaging with a gear $a^4$, which, through the train of gears $a^5$ and $a^6$, as shown in Fig. 6, impart the necessary motion to the timing plate. It will be understood, of course, that these gears can be compounded or arranged in such manner as may be necessary to secure the rotation of the timing plate in any desired period of time. To feed the wire forward I introduce it through a guide tube $b'$, supported in any desired manner. This tube is provided with a slot on its top, not shown, through which the end piece $b^2$, connected by a rope $b^3$ to a weight $B^4$, is permitted to move and advance the rod or wire when the chuck is opened after the screw has been formed and cut off. While we have shown this specific method of feeding the wire forward, other and different means can be used, and we do not therefore desire to limit ourselves to this specific method of feeding the wire forward when the chuck is open.

Second. After the wire or rod, intended to be formed into screws, has been forwarded or advanced into position, and is held by the movements above described, the next step in its manipulation relates to the cutting of its external surface into the desired form that may have been decided upon for the screws. In order to effect this external shaping of the screw, I have arranged, on the same shaft that carries the gear wheel $a^4$, a spur pinion E. This pinion engages with the gear wheel E', on a shaft $E^2$, and imparts rotation to it. At one end of this shaft is arranged a beveled gear $E^3$ engaging with the beveled gear $E^4$ on a vertical shaft $E^5$. At the top of this vertical shaft is arranged a cam F, which rotates with the shaft $E^5$. Above the cam I arrange an adjustable slide F', provided with a pin or stud $f$, against which the cam engages in its rotations. Immediately above this slide I arrange another slide $F^2$, which I will term the main slide, supported in suitable guide-ways, and connected by means of a screw $f'$ with the adjustable slide directly operated by the cam. I mount on this main slide a tool holder $F^3$, adapted to receive and hold a tool $f^2$, which may be provided with a cutting edge of any desired form. The cutting edge of the tool is intended to bear against the wire or rod, as it is held in the chuck and rotated with it, so as to cut away or shave off the external surface of the rod to give the screw the desired diameter and the head the desired form. As the cam rotates, it is so timed as to hold the cutting tool against the wire or rod long enough to impart to it the desired form, but as it continues to rotate its pressure on the pin $f$ ceases, when the main slide may be moved back by a spring or other convenient means, so as to remove the cutting tool from its operative position.

Third. I have described above the means for forming the outside of the screw to its desired shape. Before this is done, however, it is necessary that the wire or rod being converted into screws should be stopped by some appropriate means, so as to insure screws of uniform lengths. But, passing for a moment the means employed for this purpose, and considering that the operation has advanced to the point where the screw has been given its external form, it is necessary that means should be provided for giving it its screw thread, where it is an externally threaded screw, or for boring it out and giving it its internal thread, where it is an internally threaded screw. These means must be adapted to be brought into place to perform their operation at the right time, and then get out of the way for succeeding operations. It is particularly to these means that I now address myself. Directly in front of the chuck I arrange a turret, G, which is intended to be rotatable step by step, and to carry a stop for limiting the forward movement of the rod; the drill for boring it, where boring is done; the tap for cutting the internal thread; and such other details as may be desired in the formation of screws of different kinds. In Fig. 1 I have shown the stop as $g$, the drill as $g'$, and the die as $g^2$. To rotate this turret step by step, and to give it the necessary advancing and receding movement, I have arranged a spur gear G' on the draw-in spindle, and engage its teeth with the pinion $G^2$, mounted on a shaft $G^3$, particularly shown in Fig. 4. This shaft passes through the turret and its supporting spindle $g^3$, and on to the other end of the machine. I mount a pinion $G^4$ on the end of the shaft, and with it drive a train of gears $G^5$, $G^6$ and $G^7$. The gear $G^7$ is mounted on a bushing $g^4$, provided with a clutch $g^5$ at its inner end, preferably formed of pins, adapted to engage with appropriate holes in a collar $g^{11}$ mounted on the end of the turret spindle $g^3$. To impart the necessary rotary motion to the turret, I provide the bushing $g^4$ with friction collars $g^6$ and $g^7$, clamping the gear $G^7$ on its opposite sides with sufficient closeness as to rotate with it, and to thereby rotate the bushing $g^4$ and the turret spindle $g^3$, with the turret G, until the pins $g^8$ on the turret strike against a stop $g^9$, when the gear $G^7$ rotates without the friction rings and turret. These pins, which correspond in number and location to the tools on the turret, and the stop against which they contact at certain intervals, are intended to hold the particular tool in place opposite the chuck to enable it to perform its work. The pins only engage with the stop when the turret is in its receded position, while the pin is permitted to pass the stop when the turret has been advanced forward to bring a new tool into place. In order to give the desired rotation to the tools mounted on the turret, I arrange a gear H on the shaft $G^3$ within the head of the turret, which is made hollow to receive and protect the operative parts by which the tools are driven. This gear engages with pinions H', one of which is on the shaft of each tool, so as to be rotated by it, thereby imparting the necessary rotary motion to the tools. In the case, however, of the tap and die holder $g^2$, the pinion H' is loose on the shaft, and clutches are provided for making it fast therewith at the desired times. As to these details, however, I will not enter into minute description, as I do not propose to make them, so far as the die and tap holder are concerned, subjects of claims. As to the means, however, for operating the drill, I will describe them more fully. The pinion H', on the shaft of the drill, is secured thereto, so that it constantly rotates with the rotation of the shaft $G^3$ and causes the drill to remain in constant rotation, but in a direction opposite to that in which the rod or stock intended to be drilled is rotating. It will be seen by this arrangement that the drill is self-centering, and dispenses with the usual centering tool. In order to give the turret carrying the tools the requisite movement forward and backward, I arrange on the shaft which carries the timing plate D, at the opposite end of such shaft, a cam plate I, shown in Fig. 2. Arranged in suitable guide-ways, to enable it to slide back and forth adjacent to the cam I, is a sliding bar I'. At the end of this sliding bar I arrange a link $i$, connected with a vibrating lever $I^2$, pivoted or fulcrumed at $i'$, so that, as the sliding bar is caused to move forward or backward through contact with the cam plate by means of a pin $i^2$, the vibrating lever will be oscillated on its pivotal point. The upper end of this lever is connected by a pin to a sliding plate $I^3$, shown in section in Fig. 5, which, by means of a pin $i^3$, engages with a collar $I^4$, in Fig. 4, mounted loosely on the turret spindle $g^3$, so that as the sliding plate $I^3$ is moved forward through the means above described, it will carry the turret and its tools forward to the same extent, which brings them into position to do the work. In doing this, a taper pin $i^4$, on the sliding plate $I^3$, enters a corresponding hole in the turret, which serves to bring the parts more perfectly into alignment and to hold them so during the operation of the tools. The cam plate I is provided with notches or depressions in its edge, corresponding in number to the number of tools on the turret, so that during its complete revolution it causes each tool to be advanced, and held advanced, the desired time to do its work, and then permits the sliding bar I', and the sliding plate $I^3$ to be moved by the action of a spring or weight, $I^6$, (Fig. 6,) so as to release the turret and permit it to be rotated one step, which brings the next tool into alignment with the chuck, or into the position for it to do its work. The pin $i^3$, which forms the connection between the collar $I^4$ and the sliding plate $I^3$, rests in a slot, so that, as the sliding plate is drawn back from the turret, its slot moves past the pin $i^3$, until the pin $i^4$ is withdrawn from the hole in the turret. This releases the turret and permits it to advance one step in its rotation, by which time the continued backward retreat of the plate $I^3$, which now contacts with the pin $i^3$, having reached the end of the slot, carries the turret spindle and the turret back with it far enough to cause the pin $g^8$ to contact with the stop $g^9$, which prevents the further rotation of the turret, until the sliding plate has been again advanced by the rotation of the cam I to carry the turret forward, by which the pin and stop are again disengaged, so that, when the turret has done its work, it may again rotate one step until again drawn back by the forward movement of the sliding plate $I^3$.

Fourth. The operations described up to this point are intended to complete the formation of the screw and prepare it to be cut off from the wire or rod. To effect this, I mount on the opposite end of the shaft $E^2$, a beveled gear J, the teeth of which engage with the teeth of a beveled gear J', at the lower end of a vertical shaft $J^2$. The upper end of this shaft carries a cam plate $J^3$, immediately above which is arranged an adjustable slide $J^4$, provided with a pin $j$, which may be acted upon by the cam in its rotation to move the adjustable slide back and forth, and thereby advance a main slide $J^5$, which carries a tool holder J', in which a cut-off tool $j^2$ is arranged. The advance of the main slide brings the cutting tool, which is preferably in the form of a disk, into operative contact with the rod or wire by which the completed screw is severed from the rest of the rod or wire. The slide and cutting tool are then receded by the action of a spring $j^3$, or other convenient means.

The operation of my machine is as follows: The wire rod is fed in through the tube $b'$, through the main driving spindle, and forward through the chuck until it contacts with the stop $g$. Power is now applied to the main driving pulley B, which, through the train of gears attached to and connected with its shaft, imparts rotation to the main driving spindle. The draw-in spindle $B^3$ is at its forward limit of longitudinal motion. The timing plate, which begins to rotate simultaneously with the starting of the machine by mechanism hereinbefore described, continuing its rotation, the pin $d$ passes out of contact with the stud $d^2$, and the pin $d'$ contacting the stud $d^2$, the lever D' is depressed, and, through its connecting mechanism, the pinion $B^6$ is moved forward into contact with the frictional disk $B^7$. This operation causes the train of gears $B^4$, $B^5$ and $B^6$, to cease rotating, and, as hereinbefore described, the draw-in spindle is retracted longitudinally, and its cap C' contacting the spring chuck $C^2$ causes the same to firmly grip the wire rod or material to be operated upon. The timing disk, still continuing to rotate, carries the pin $d'$ out of contact with the stud $d^2$, thereby allowing the lever D', its connecting mechanism, and the pinion $B^6$, to resume their normal position, which brings the pinion $B^6$ half way between the friction disk $B^7$ and the driving pinion $B^2$, and allows its train of gears and draw-in spindle $B^3$ to rotate at the same velocity and in connection with the main driving spindle $A^2$, until the timing disk has completed one rotation, during which period of time a screw or other article has been formed and cut off, and the pin $d$ again impinges the stud on the lever D', when, by the mechanism hereinbefore described, the spring chuck is opened and the rod fed forward the desired length. At the beginning of the rotation of the main driving mechanism, the turret G is in its forward position and holding the stop $g$ in alignment with the chuck and wire rod, thus limiting the forward motion of the wire rod sufficiently to form a screw, or other article to be manufactured. The rotation of the machine continuing, the cam plate I is rotated, and the pin $i^2$ coming opposite a notch in the cam plate, the sliding bar I' is free to have its spring or weight move it back, and, with the connecting link and levers, impart a rearward motion to the slide I³, thereby carrying the pin $i^4$ out of engagement with its recess in the turret, and allowing the same to be rotated forward one step, and bring the next tool into alignment with the wire rod to operate thereon. During these operations the slide F², with its cutting mechanism, has been driven forward by mechanism hereinbefore described, and the external surface of the wire has been cut away to correspond to the desired shape, or the shape of the cutting tool, and has been withdrawn from operation, leaving the screw clear or free to be operated on by the next tool in the turret bearing head. The turret is again advanced with its milling tool, if it be an externally threaded screw, or with a revolving drill, if it be an internally threaded nut. The stock is removed from the external or the internal surface, forming the outer or inner diameter of a threaded screw. The turret is now forced back into its receded position by the mechanism hereinbefore described, and is rotated again forward one step, bringing the die or tap into alignment with the screw or nut to be operated upon. The turret coming forward again with the die or tap cuts the thread or taps out the nut, and, after accomplishing the same, is forced back again into its receded position. The slide J⁵ is now driven forward with its cut-off tool sufficiently to entirely sever the completed screw or wire rod. The rotation of the machine continuing, the slide J⁵ is allowed to recede to its backward limit of motion. A screw or nut has now been completed, and the wire rod being of indefinite length, the main driving power is allowed to continue, and the operations which I have described continue, one succeeding the other, until the desired quantity of screws or nuts have been manufactured, when the main driving power is stopped and the machine ceases operation.

It will be seen that I have described my mechanism as arranged to manufacture screws or internally threaded nuts that have irregular, cylindrical shaped heads, and where a forming cutter is necesary to give this irregular shape, but it can readily be seen from an inspection of the drawings and the description of construction and operation in the foregoing specification that a variety of shaped screws can be manufactured, and the cams for operating the cross slides may be so timed as to operate on material simultaneously, forming the article at the same time that it is being cut off. Or, the forming cutter may be dispensed with, and, if it be a thumb screw with a knurled head that is being manufactured, a knurled tool can be mounted on the slide F², instead of said forming cutter, otherwise, the arrangement of parts and sequence of operations will be the same. With very slight alteration and arrangement of parts, the mechanism can be arranged to manufacture or rough out pinions, small shafts, or other irregular cylindrical pieces.

What I regard as new, and desire to secure by Letters Patent, is—

1. The combination of a main driving spindle, gears rotating the same, a draw-in spindle engaging the threaded portion of the main spindle, a spring chuck arranged at one end of the draw-in spindle, and gears rotating the draw-in spindle at one period and holding it from rotation at another for moving it forward and backward on the threaded portion of the main spindle, whereby the chuck is closed or allowed to open, substantially as described.

2. The combination of a main driving spindle, gears rotating the same, a draw-in spindle engaging a threaded portion of the main spindle, a spring chuck arranged at one end of the draw-in spindle, gears rotating the draw-in spindle at one period and holding it from rotation at another for moving it forward and backward on the threaded portion of the main spindle, and clutches effecting the rotation or non-rotation of the draw-in spindle through the last mentioned gears, substantially as described.

3. The combination of a main driving spindle, gears rotating the same, a draw-in spindle engaging a threaded portion of the main spindle, a spring chuck arranged at one end of the draw-in spindle, gears rotating the draw-in spindle at one period and holding it from rotation at another for moving it forward and backward on the threaded portion of the main spindle, clutches effecting the rotation or non-rotation of the draw-in spindle through the last mentioned gears, a timing plate and a lever arranged to be acted upon by the rotation of the timing plate and move the clutch into or out of its different engagements at the proper time, substantially as described.

4. The combination of the rod holding and driving mechanism, mechanism for giving the external shape to the screw, a tool carrying turret with its axis in a horizonal plane, means for imparting a step by step rotation to the turret, a reciprocating slide adapted to engage the turret spindle and impart a forward and backward motion to the turret, a pin on the reciprocating slide adapted to engage recesses in the turret and prevent it from rotating during its forward motion, mechanism connecting the reciprocating slide and the turret spindle so arranged and constructed that the said pin on the reciprocating slide is engaged with a recess in the turret during its forward motion and withdrawn from the turret during its backward motion so that the turret may be rotated one step in its rotation, and means for imparting motion to the reciprocating slide, substantailly as described.

5. The combination of the rod holding and driving mechanism, mechanism for giving the external shape to the screw, a tool carrying turret with its axis arranged in a horizontal plane, means for imparting a step by step rotation to the turret, a reciprocating slide adapted to engage with the turret and move the same backward and forward, a vibrating lever one arm of which engages the reciprocating slide and the other a sliding bar, a sliding bar adapted to move forward and backward, and connected with the vibrating lever, and means for imparting motion to the sliding bar a predetermined number of times corresponding to the number of tools in the turret, substantially as described.

6. The combination of the rod holding and driving mechanism, mechanism for giving the external shape to the screw, a tool carrying turret, means for imparting a step by step rotation to the turret, a reciprocating slide adapted to engage the turret and move the same forward and backward, a tapered pin on the said slide and a corresponding hole in the turret to hold the same in alignment during its forward motion, a vibrating lever one arm of which engages the reciprocating slide and the other a sliding bar, and means for moving the sliding bar forward and backward for imparting motion to the reciprocating slide, substantially as described.

7. The combination of the rod holding and driving mechanism, mechanism for giving the external shape to the screw, a tool carrying turret with its axis arranged in a horizontal plane, means for imparting a step by step rotation to the turret, a reciprocating slide adapted to engage with the turret and move the same backward and forward, a vibrating lever one arm of which engages the reciprocating slide and the other a sliding bar, a sliding bar adapted to move forward and backward and connected with the vibrating lever, a rotating cam arranged adjacent to the sliding bar and provided with operative surfaces corresponding in number to the tools in the turret and means for operating the rotating cam, substantially as described.

8. An organized machine in which are combined the following elements, a gear driven main spindle, a longitudinally movable rotatable draw-in spindle, a spring chuck arranged at one end of the same, gears adapted by their rotation and non-rotation to impart the longitudinal motions to the draw-in spindle for opening and closing the chuck, a cam driven slide carrying a forming cutter into and out of contact with the wire rod for giving the external shape to the screw, a tool carrying turret having a step by step rotation, means for imparting the step by step rotation, a reciprocating slide for moving the turret forward and backward, mechanism for imparting motion to the reciprocating slide a number of times corresponding to the number of tools in the turret, means for cutting off the completed screw from the wire rod, and means for advancing the rod a determined length after the completed article has been cut off, substantially as described.

9. An organized machine in which are combined the following elements, a gear driven main spindle, a longitudinally movable rotatable draw-in spindle, a spring chuck arranged at one end of the draw-in spindle, gears adapted by their rotation and non-rotation to impart the longitudinal motions to the draw-in spindle for opening and closing the chuck, a cam driven slide carrying a forming cutter into and out of contact with the wire rod for giving the external shape to a screw or other article, means for cutting off the completed article from the wire rod, and means for advancing the rod a determined length after the completed article has been cut off, substantially as described.

10. The combination of a tool carrying turret, means for giving the turret a step by step rotation, consisting of a gear wheel mounted rotatably near one end of the turret bearing spindle and engaging the same in frictional contact for rotating the turret when it is free from its stops and index pin, pins on the turret and a stop on the frame for limiting the rotation of the turret, and means for advancing and receding the turret and bringing its different tools into alignment with the wire rod at its successive steps of rotation, substantially as described.

CHARLES GROTZ.

Witnesses:
J. F. BLAKE,
J. S. SURBAUGH.